(12) United States Patent
Chopra et al.

(10) Patent No.: US 11,586,505 B2
(45) Date of Patent: Feb. 21, 2023

(54) SYSTEM AND METHOD FOR FILE SYSTEM METADATA FILE REGION SEGMENTATION FOR DEDUPLICATION

(71) Applicant: EMC IP Holding Company LLC, Hopkinton, MA (US)

(72) Inventors: Shelesh Chopra, Bangalore (IN); Sunil Yadav, Bangalore (IN); Aaditya Rakesh Bansal, Bangalore (IN); Ravi Vijayakumar Chitloor, Bengaluru (IN); Manish Sharma, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/330,074

(22) Filed: May 25, 2021

(65) Prior Publication Data

US 2022/0382641 A1 Dec. 1, 2022

(51) Int. Cl.
*G06F 16/00* (2019.01)
*G06F 11/14* (2006.01)
*G06F 16/174* (2019.01)

(52) U.S. Cl.
CPC ...... *G06F 11/1453* (2013.01); *G06F 16/1744* (2019.01); *G06F 16/1748* (2019.01); *G06F 2201/84* (2013.01)

(58) Field of Classification Search
CPC ............ G06F 11/1453; G06F 16/1744; G06F 16/1748; G06F 2201/84
See application file for complete search history.

(56) References Cited

U.S. PATENT DOCUMENTS

| 7,719,443 B1 * | 5/2010 | Natanzon ............ G06F 11/2071 341/51 |
| 9,804,934 B1 * | 10/2017 | Natanzon ............ G06F 11/1471 |
| 10,241,870 B1 * | 3/2019 | Beatty .................... G06F 16/903 |
| 10,409,692 B1 * | 9/2019 | Brenner .............. G06F 12/0253 |

* cited by examiner

*Primary Examiner* — Tyler J Torgrimson
(74) *Attorney, Agent, or Firm* — Chamberlain, Hrdlicka, White, Williams & Aughtry

(57) ABSTRACT

A method for managing file based backups (FBBs) includes obtaining, by a backup agent, a backup request for a FBB, in response to the backup request, generating a FBB, generating a FBB metadata file corresponding to the FBB, wherein the FBB metadata file comprises a set of attribute regions, performing, using the set of attribute regions, a deduplication on the FBB metadata file to obtain a deduplicated FBB metadata file, and storing the deduplicated FBB metadata file in a backup storage system.

11 Claims, 6 Drawing Sheets

SYSTEM AND METHOD FOR FILE SYSTEM METADATA FILE REGION SEGMENTATION FOR DEDUPLICATION

BACKGROUND

Computing devices in a system may include any number of internal components such as processors, memory, and persistent storage. The storage of data across multiple computing devices may require significant use of such internal components. Performing deduplication on such data prior to storage may improve the overall operation of such computing devices.

SUMMARY

In general, in one aspect, the invention relates to a method for managing file based backups (FBBs). The method includes obtaining, by a backup agent, a backup request for a FBB, in response to the backup request, generating a FBB, generating a FBB metadata file corresponding to the FBB, wherein the FBB metadata file comprises a set of attribute regions, performing, using the set of attribute regions, a deduplication on the FBB metadata file to obtain a deduplicated FBB metadata file, and storing the deduplicated FBB metadata file in a backup storage system.

In general, in one aspect, the invention relates to a non-transitory computer readable medium that includes computer readable program code, which when executed by a computer processor enables the computer processor to perform a method for managing file based backups (FBBs). The method includes obtaining, by a backup agent, a backup request for a FBB, in response to the backup request, generating a FBB, generating a FBB metadata file corresponding to the FBB, wherein the FBB metadata file comprises a set of attribute regions, performing, using the set of attribute regions, a deduplication on the FBB metadata file to obtain a deduplicated FBB metadata file, and storing the deduplicated FBB metadata file in a backup storage system.

In general, in one aspect, the invention relates to a system that includes a processor and memory that includes instructions, which when executed by the processor, perform a method. The method includes obtaining, by a backup agent, a backup request for a FBB, in response to the backup request, generating a FBB, generating a FBB metadata file corresponding to the FBB, wherein the FBB metadata file comprises a set of attribute regions, performing, using the set of attribute regions, a deduplication on the FBB metadata file to obtain a deduplicated FBB metadata file, and storing the deduplicated FBB metadata file in a backup storage system.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
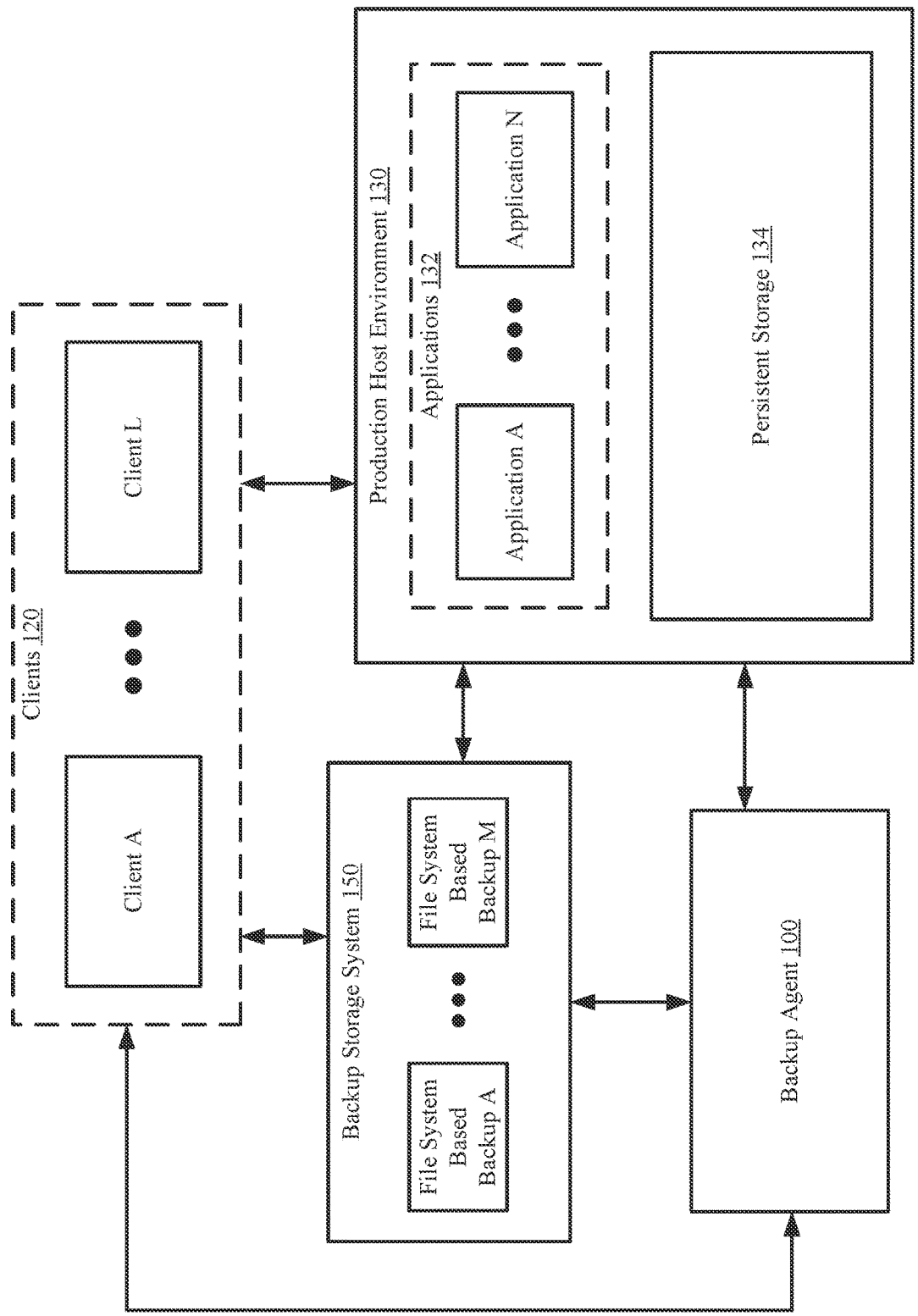
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing storage of file based backups. Specifically, embodiments of the invention include a method of generating and storing file based backups (FBBs) in a backup storage environment. The method may include modifying a FBB metadata file using a segmentation to obtain a set of two or more metadata file regions. The metadata file regions may be generated based on a predicted frequency of change of attributes of one or more files.

The metadata files are used for multiple metadata related storage methods including cataloging and indexing multiple application data protection agents including file systems, next generation network-attached storage (NAS), Kubernetes application containers, and/or any other workloads. When the file system metadata file associated with each backup copy is backed up to any deduplication supported remote storage appliance, e.g., Data Domain, unlike the data containers, the deduplication ratio of these files is very poor between the backup iterations. The deduplication ratio of a file may be defined as the ratio of the total size of the file over the storage size of the file after the deduplication has been performed.

As used herein, deduplication refers to methods of storing only portions of files (also referred to as file segments or segments) that are not already stored in persistent storage. For example, when multiple versions of a large file, having only minimal differences between each of the versions, are stored without deduplication, storing each version will require approximately the same amount of storage space of a persistent storage. In contrast, when the multiple versions of the large file are stored with deduplication, only the first version of the multiple versions stored will require a substantial amount of storage. Once the first version is stored in the persistent storage, the subsequent versions of the large file subsequently stored will be de-duplicated before being stored in the persistent storage resulting in much less storage space of the persistent storage being required to store the subsequently stored versions when compared to the amount of storage space of the persistent storage required to store the first stored version.

In the current layout of the metadata file, the metadata files specify attributes such as, for example, a file identifier, a parent identifier, a hash value of the file, an offset of the file, a size of the file, a header size, a coverage size, a checksum value of the file, and a container identifier for the file system. Other attributes may be used without departing from the invention.

Embodiments of the invention relate to a method for performing a region segmentation of these attributes based on a likelihood of changeability of these attributes between iterations of the file based backups. The region segmentation may include identifying a number of regions to generate for the metadata file attributes, and assigning a region to each attribute. Following the generation of the regions, the method further includes populating each region with the assigned attributes, and replacing the metadata files with the generated regions. During generation of a file based backup, and subsequently a corresponding metadata file, the metadata file may be deduplicated based on the generated regions.

The identified regions may be generated based on a likelihood of changeability of the metadata file attributes. For example, a first region may correspond to constant attributes. In one or more embodiments of the invention, the constant attributes relate to attributes that are not likely to change for files between iterations of the file based backups. Such attributes may include, for example, the file identifier and the parent identifier. A second region may relate to attributes that are likely to change as the file is changed. Such attributes may include, for example, the size of the file, the hash of the value, and the checksum value of the file. A third region may relate to attributes of a file that are likely to change as other files are changed. Such attributes may include, for example, an offset of the file in a storage device.

In one or more embodiments of the invention, following a generation of the file system backup and the associated metadata file, the backup agent orchestrating the backup generation, deduplication, and storage of the deduplicated metadata file may analyze the deduplication ratio of the metadata file to determine whether a resegmentation is to be performed. The resegmentation may be performed in response to the deduplication ratio meeting a criterion (e.g., the deduplication ratio being below a predetermined threshold). The resegmentation may include, for example, reassigning the attributes to any of the regions and/or modifying the regions generated to obtain updated regions, and assigning the attributes to any of the updated regions.

FIG. 1 shows an example system in accordance with one or more embodiments of the invention. The system includes a backup agent (100), one or more clients (120), a production host environment (130) and a backup storage system (150). The system may include additional, fewer, and/or different components without departing from the invention. Each component may be operably connected to any of the other components via any combination of wired and/or wireless connections. Each component illustrated in FIG. 1 is discussed below.

In one or more embodiments of the invention, the backup agent (100) manages backup operations of data in the production host environment (130). The backup operations may include generating, storing, and/or recovering file based backups (FBBs). In one or more embodiments of the invention, a FBB is a backup of a file system updated, modified, and/or otherwise accessed by the applications (132) in the production host environment (130). The backup agent (100) may perform the method of FIG. 3A-3B to generate the FBBs.

Figure 5:
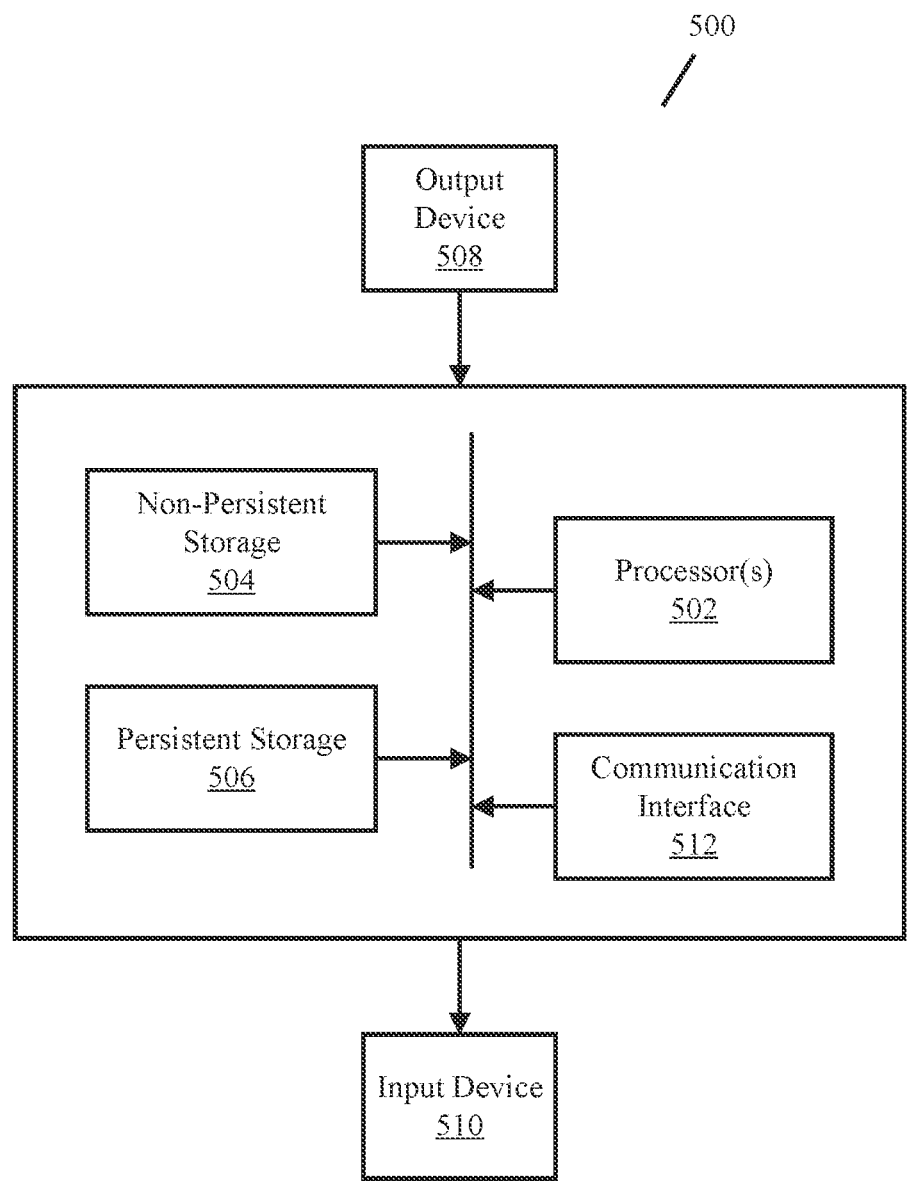
FIG. 5 shows a diagram of a computing device in accordance with one or more embodiments of the invention.

In one or more embodiments of the invention, the backup agent (100) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup agent (100) described throughout this application and/or all, or a portion thereof, of the methods illustrated in FIGS. 3A-3B.

In one or more embodiments of the invention, the backup agent (100) is implemented as a logical device. The logical device may utilize the computing resources of any number of computing devices and thereby provide the functionality of the backup agent (100) described throughout this application and/or all, or a portion thereof, of the methods illustrated in FIGS. 3A-3B.

In one or more embodiments of the invention, the production host environment (130) hosts applications (132). The applications (132) may be logical entities executed using computing resources (not shown) of the production host environment (130). Each of the applications may be performing similar or different processes. In one or more embodiments of the invention, the applications (132) provide services to users, e.g., clients (not shown). For example, the applications (132) may host components. The components may be, for example, instances of databases, email servers, and/or other components. The applications (132) may host other types of components without departing from the invention.

In one or more embodiments of the invention, the applications (132) generate application data to be utilized for the servicing of the users. The application data may be organized in accordance with a file system. The file system may include any number of files organized into directories. For example, the directories may include paths for accessing the files. The file system may be stored in a container stored in the persistent storage (134) of the production host environment (130).

In one or more of embodiments of the invention, the applications (132) are implemented as computer instructions, e.g., computer code, stored on a persistent storage (e.g., 134) that when executed by a processor(s) of the production host environment (130) cause the production host environment (130) to provide the functionality of the applications (132) described throughout this application.

In one or more embodiments of the invention, the production host environment (130) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host environment (130) described throughout this application.

In one or more embodiments of the invention, the production host environment (130) is implemented as a logical device. The logical device may utilize the computing resources of any number of computing devices and thereby provide the functionality of the production host environment (130) described throughout this application.

In one or more embodiments of the invention, each of the backup storage systems (150) stores FBBs. The FBBs may be backups for file systems. The file systems may be based on files used by the applications (132). The FBBs may each correspond to a point in time of the file system. The FBBs may be used to restore the file system to such corresponding point in time.

In one or more embodiments of the invention, at least a portion of the FBBs may be deduplicated prior to storage in the backup storage system (150). As discussed above, deduplication refers to methods for only storing portions of a file (e.g., a FBB) in the backup storage system (150) that are not already stored in the backup storage system.

In one or more embodiments of the invention, the backup storage system (150) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the backup storage system (150) described throughout this application.

In one or more embodiments of the invention, the backup storage system (150) is implemented as a logical device. The logical device may utilize the computing resources of any number of computing devices and thereby provide the functionality of the backup storage system (150) described throughout this application.

Figure 2:
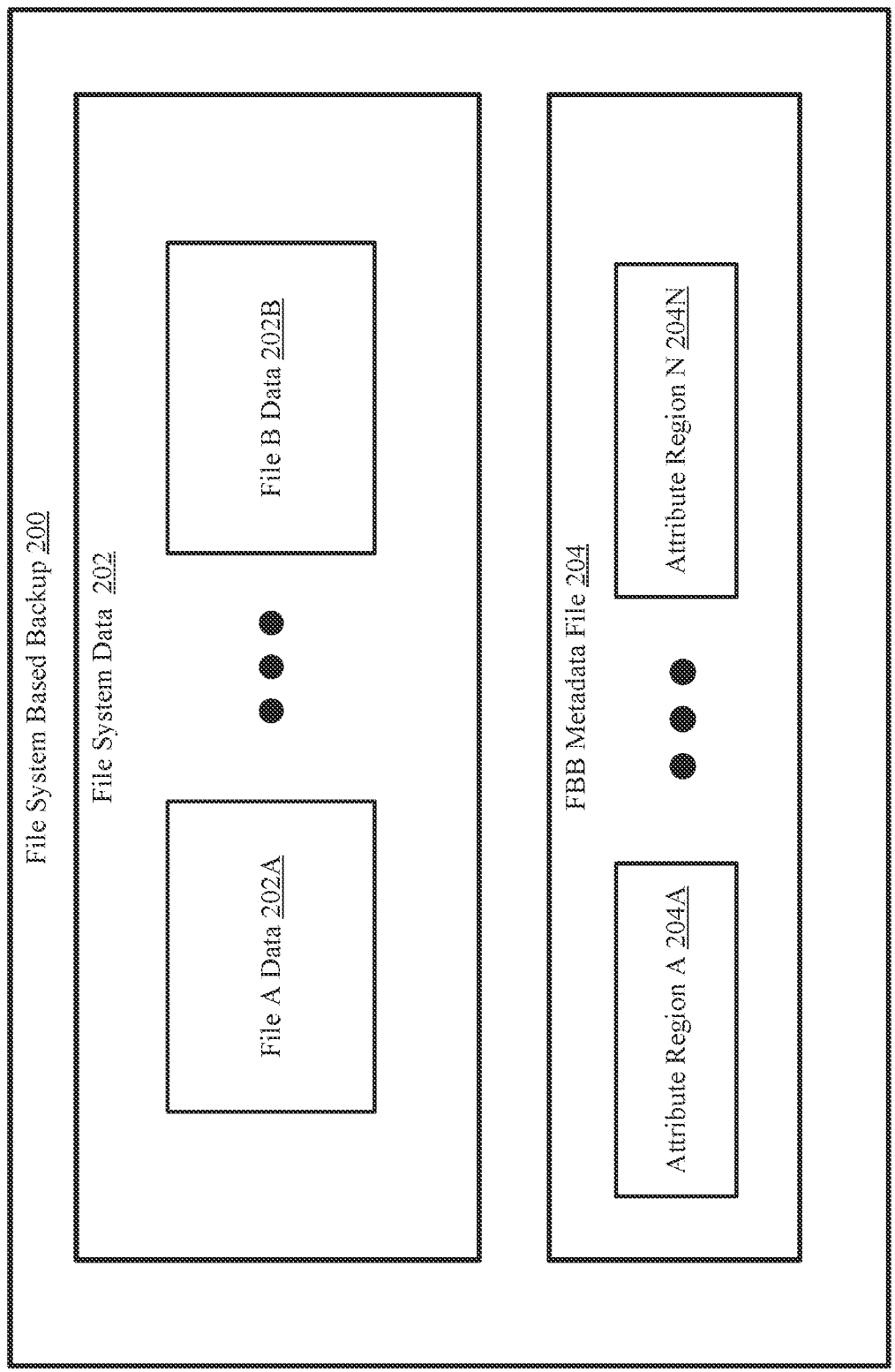
FIG. 2 shows a diagram of a file based backup (FBB) in accordance with one or more embodiments of the invention.

FIG. 2 shows a diagram of a file based backup without departing from the invention. The file based backup (200) may be an embodiment of a file based backup discussed in FIG. 1. As discussed above, the file based backup (200) is a data structure that includes the data in a file system at a point in time. The file based backup (200) may include file system data (202) and a FBB metadata file (204).

In one or more embodiments of the invention, the file system data includes data for one or more files (202A, 202B). Each file data (202A, 202B) may correspond to a file in the file system.

In one or more embodiments of the invention, the FBB metadata file (204) is a data structure that includes metadata corresponding to the files in the file system data (202). The metadata may include attributes of a file. Each attribute may describe an aspect of a file. Examples of attributes include, but are not limited to: a file identifier, a parent file identifier, a container identifier, a file size, a hash value of the file data, a checksum value of the file data, a header size, and an offset of the file in which is stored.

In one or more embodiments of the invention, the attributes in the FBB metadata file (204) are grouped into attribute regions (204A, 204N). The attribute regions (204A, 204N) may be groupings of the metadata attributes. The attribute regions (204A, 204N) may be grouped based on a likelihood of an attribute changing between various iterations of a FBB (e.g., 200).

For example, consider a scenario in which a first attribute (e.g., a file size) changes from a first iteration of a file system of a first FBB to a second iteration of the file system of a second FBB. In contrast, a second attribute (e.g., a file name) may remain the same between the two iterations of the file system. In such scenario, based on their likelihood to change in future iterations of the file system, the first attribute may correspond to a first attribute region, and the second attribute may correspond to a second attribute region.

Figure 3A:
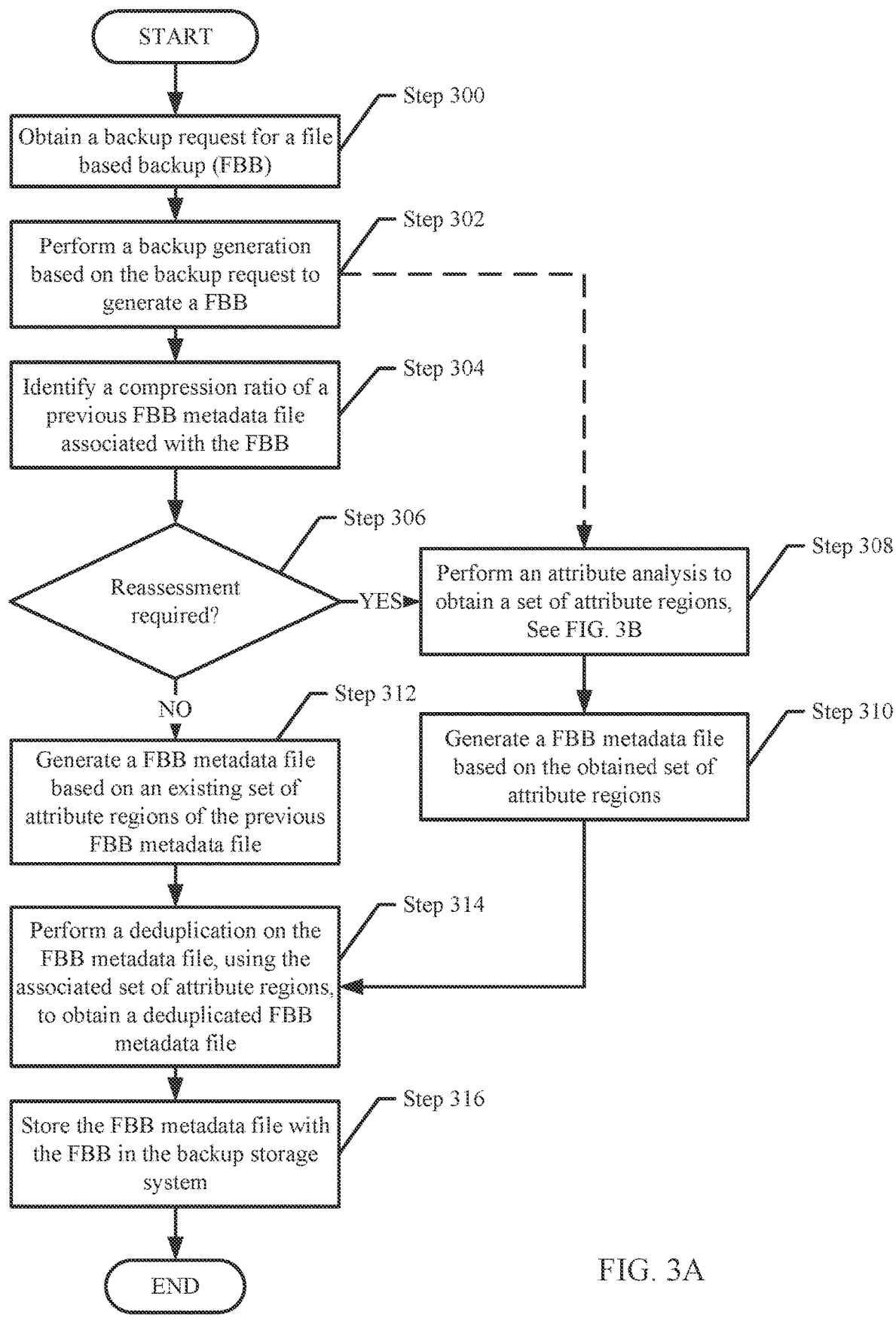
FIG. 3A shows a flowchart for generating and storing a file based backup in accordance with one or more embodiments of the invention.
Figure 3B:
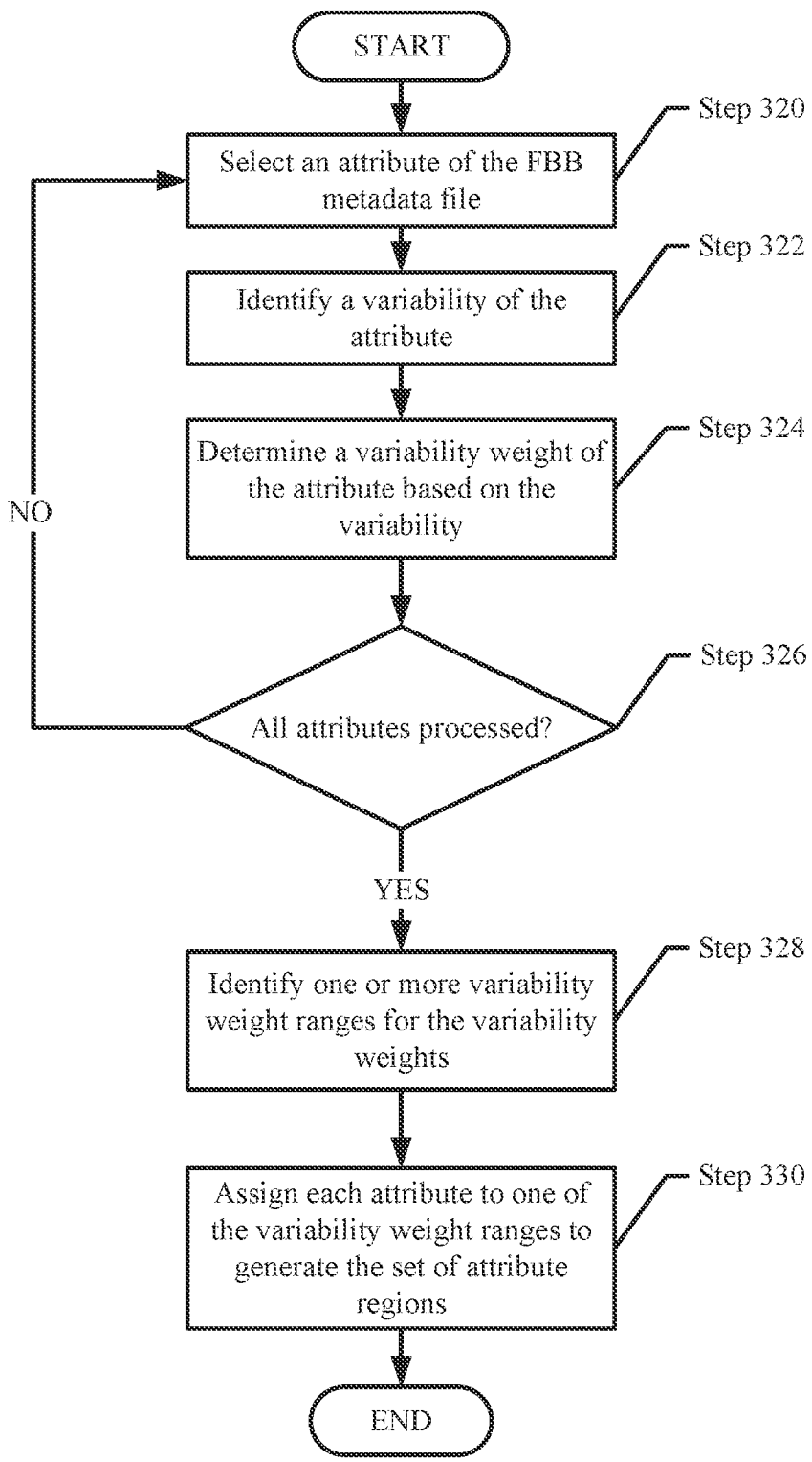
FIG. 3B shows a flowchart for performing an attribute analysis in accordance with one or more embodiments of the invention.

FIGS. 3A-3B show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 3A-3B may be performed in parallel with any other steps shown in FIGS. 3A-3B without departing from the scope of the invention.

FIG. 3A shows a flowchart for generating a file based backup in accordance with one or more embodiments of the invention. The method shown in FIG. 3A may be performed by, for example, a backup agent (e.g., 100, FIG. 1). Other components of the system illustrated in FIG. 1 may perform the method of FIG. 3A without departing from the invention.

Turning to FIG. 3A, in step 300, a backup request for a file based backup (FBB) is obtained. The backup request may specify generating a full backup of the file system, an incremental backup relative to a previous backup of the file system, and/or any other type of backup without departing from the invention. The backup request may be based on a backup policy implemented by the backup agent.

In step 302, a backup generation is performed based on the backup request to generate a FBB. In one or more embodiments of the invention, the backup is generated in accordance with the backup request. The FBB may include the file system data of the file system.

In one or more embodiments of the invention, if the FBB is a first iteration of the file system stored in the backup storage system, the method may proceed to step 308. If this is the second iteration or more, the method proceeds to step 304.

In step 304, a deduplication ratio is identified of a previous FBB metadata file associated with the FBB. In one or more embodiments of the invention, the deduplication ratio is a measurement of the ratio of the total size of the file over the storage size of the file after the deduplication has been performed. The deduplication ratio may be identified from the previous FBB metadata file by recalculating such value using the total size of the FBB metadata file and the storage size of the FBB metadata file. Alternatively, the compression ratio may be stored in the backup storage system (or any other storage system), and correspond to the previous FBB metadata file.

In step 306, a determination is made about whether a reassessment is required. In one or more embodiments of the invention, the reassessment is determined based on the deduplication ratio. Specifically, if the deduplication ratio is determined to be below a deduplication ratio, it may be determined that the reassessment is required. If a reassessment is required, the method proceeds to step 308; otherwise, the method proceeds to step 312.

In step 308, an attribute analysis is performed to obtain a set of attribute regions. In one or more embodiments of the invention, the attribute analysis is a process for evaluating the attributes of the files to determine a new set of attribute regions in which to assign each attribute. Specifically, a likelihood of variability is determined for each attribute. The likelihood of variability is determined by identifying a variability of each attribute of any number of files from the previous FBB metadata file.

In one or more embodiments of the invention, the attribute analysis is performed in accordance with FIG. 3B. The attribute analysis may be performed via any other method without departing from the invention.

In step 310, a FBB metadata file is generated based on the obtained set of attribute regions. In one or more embodiments of the invention, the FBB metadata file is generated by generating data structures for each attribute region of the new set of attribute regions and specifying the assigned attributes of each attribute region for each file in the file system.

In step 312, following the determination that the reassessment is not required, a FBB metadata file is generated based on an existing set of attribute regions of the previous FBB metadata file. In one or more embodiments of the invention, the FBB metadata file is generated by generating data structures for each attribute region of the existing set of attribute regions and specifying the assigned attributes of each attribute region for each file in the file system.

In step 314, a deduplication is performed on the FBB metadata file using the associated set of attribute regions to obtain a deduplicated FBB metadata file. In one or more embodiments of the invention, the FBB metadata file is deduplicated on a per-attribute region basis. The deduplication may include identifying a similar attribute region of the previous FBB metadata file, and performing the deduplication relative to the similar attribute region. The set of attribute regions in the FBB metadata file may be the existing set of attribute regions if the FBB metadata file was generated without a reassessment.

In step 316, the FBB metadata file is stored in a backup storage system. In one or more embodiments of the invention, the FBB metadata file is stored in accordance with the deduplication discussed in step 314.

FIG. 3B shows a flowchart for managing upgrade issue reports in accordance with one or more embodiments of the invention. The method shown in FIG. 2B may be performed by, for example, a backup agent (e.g., 100, FIG. 1). Other components of the system illustrated in FIG. 1 may perform the method of FIG. 2B without departing from the invention.

In step 320, an attribute of the FBB metadata file is selected.

In step 322, a variability of the attribute is identified. In one or more embodiments of the invention, the variability is identified by comparing the attribute for the files in the file system over any number of previous FBBs. The variability may be measured by the amount of differences in values between the iterations for the multiple files of the attribute.

In step 324, a variability weight of the attribute is determined based on the variability. In one or more embodiments of the invention, the variability weight is a measurement of the likelihood that the attribute is to change in future iterations of the file system for future FBBs. The variability weight may be based on the variability identified in step 322.

In step 326, a determination is made about whether all attributes of the FBB metadata file have been processed (e.g., whether a variability weight has been determined for all attributes). If all attributes have been processed, the method proceeds to step 328; otherwise, the method returns to step 320.

In step 328, one or more variability weight ranges are identified for the variability weights. In one or more embodiments of the invention, the variability weight ranges are ranges of values corresponding to a group of variability weights. The variability weight ranges may be identified by identifying a lowest-valued variability weight of all the attributes, identifying a highest-valued variability weight of the attributes, and sub-dividing the range between the highest-value and the lowest-value variability weights into two or more variability weight ranges. The variability weight ranges may be sub-divided via any mechanism of sub-division without departing from the invention. For example, the sub-division may be performed such that each of the variability weight ranges is divided evenly.

In step 330, a set of attribute regions are generated by assigning each attribute to one of the variability weight ranges. In one or more embodiments of the invention, the assigning of an attribute is performed based on the weight range in which the attribute's variability weight corresponds.

EXAMPLE

Figure 4:
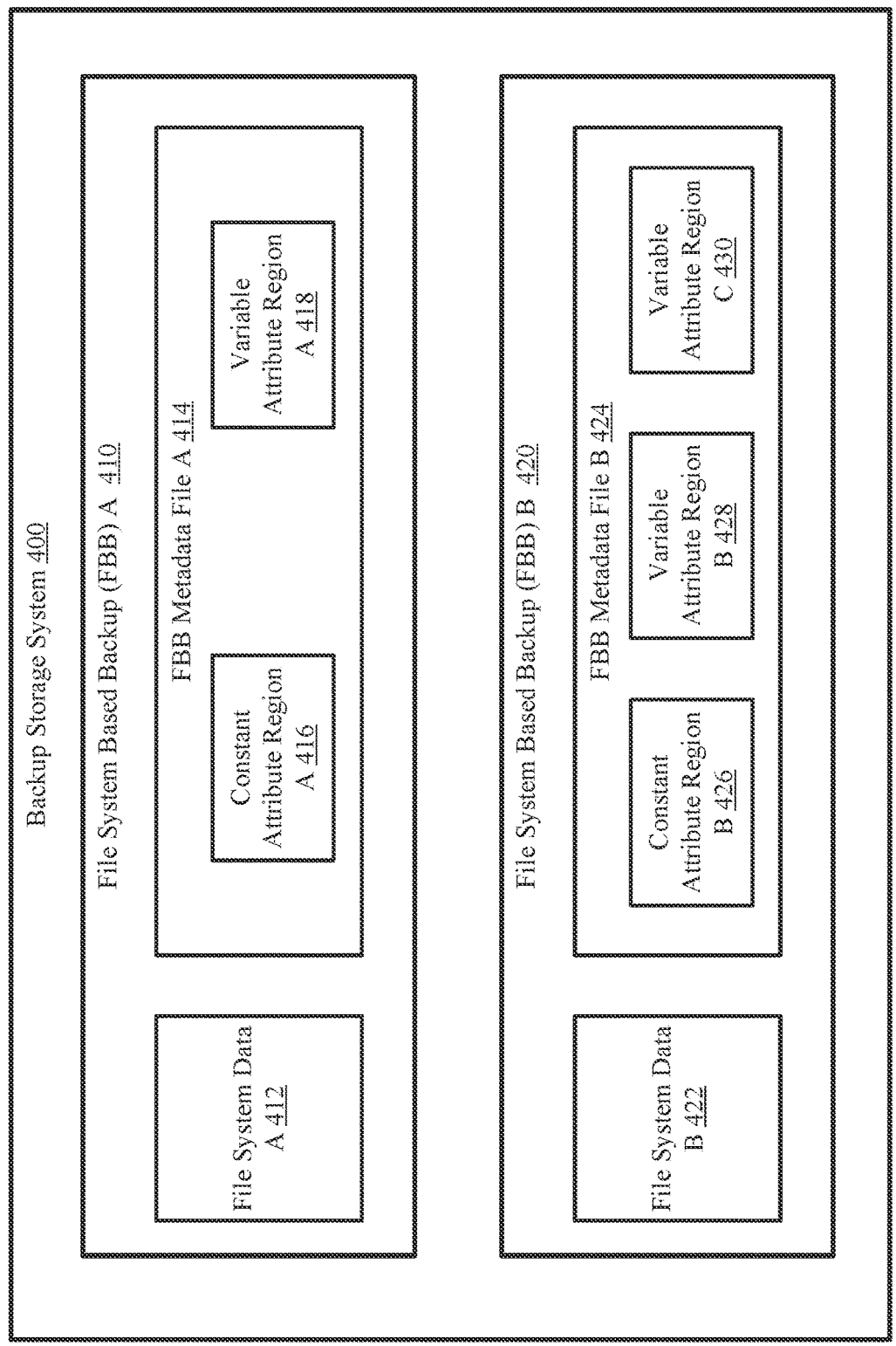
FIG. 4 show an example in accordance with one or more embodiments of the invention.

The following section describes an example. The example, illustrated in FIG. 4, is not intended to limit the invention and is independent from any other examples discussed in this application. Turning to the example, consider a scenario in which a backup storage system stores two file based backups (FBBs).

FIG. 4 shows a diagram of an example backup storage system. The backup storage system (400) includes two file based backups (410, 420). FBB A (410) includes file system data A (412), which corresponds to a first iteration of the file system at a first point in time. The file system data A (412) includes data for a set of files in the file system.

FBB A (410) further includes metadata file A (414). Metadata file A (414) is divided into two attribute regions, constant attribute region A (416) and variable attribute region A (418). Constant attribute region A (416) includes attributes that were determined by a backup agent to not be likely to change in future iterations of the file system. The metadata attributes specified in constant attribute A (416) include the file name, the parent file name, the container identifier, and a header size of the file. The metadata attributes specified in variable attribute region A (418) include the file size, the file offset, the hash value of the file, and a checksum value of the file. The attribute regions (416, 418) are generated in accordance with the methods of FIGS. 3A and 3B.

After generation of FBB A (410), the methods of FIGS. 3A and 3B are performed by the backup agent (not shown) for a backup generation of FBB B (420). Prior to the generation of FBB B (420), a deduplication ratio of FBB A (410) is below a deduplication threshold.

Based on this determination, an attribute assessment is performed on FBB metadata file A (414) to determine that the offset attribute of a file is to be in its own variable attribute region. The attribute assessment may be in accordance with FIG. 3B. Specifically, each attribute of FBB metadata file A is analyzed to determine a variability weight for each attribute. Based on the analysis, it is determined that the file name has a variability weight of 0.1, the parent file name has a variability weight of 0.1, the container identifier has a variability weight of 0.2, the header size of the file has a variability weight of 0.3, the file size has a variability weight of 1.2, the file offset has a variability weight of 8.9, the hash value of the file has a variability weight of 1.9, and the checksum value of the file has a variability weight of 2.1. Using these variability weights, variability weight ranges are determined where: any attributes with variability weights between 0.0 and 1.0 are associated with constant attribute region B (426); any attributes with variability weights between 1.1 and 4.0 are associated with variable attribute region B (428); and attributes with variability weights above 4.0 are associated with variable attribute region C (430).

The high variability weight of the offset attribute is due to the offset of multiple files varying if one file's size is modified. As such, there is a greater likelihood of variability for an offset attribute between each iteration of the file system than there is for other attributes in the variable attribute region.

Based on the determined variability weight ranges, the metadata attributes specified in constant attribute B (426) include the file name, the parent file name, the container identifier, and a header size of the file. The metadata attributes specified in variable attribute region B (428) include the file size, the hash value of the file, and a checksum value of the file. The metadata attribute specified in variable attribute region C (430) includes the file offset.

Such reassessment and regeneration of attribute regions of FBB metadata file B (424) relative to FBB metadata file A (410) may reduce the deduplication ratio between the two metadata files. However, future iterations of the FBB metadata file may be deduplicated relative to FBB metadata file B (424). Specifically, when a third FBB is generated, the FBB metadata file of the third FBB may include the attribute regions associated with FBB metadata file B (424), and such FBB metadata file may be deduplicated relative to FBB metadata file B (424).

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the use of deduplication operations being used in a storage system. Embodiments of the invention divide metadata files into attribute regions based on the variability of the attributes between multiple iterations of a file based backup. Attribute regions with low variability may be more easily deduplicated, and the deduplication ratio of the low variability attribute regions (e.g., the constant attribute regions) may be more heavily deduplicated, thus reducing the amount of data stored in the storage system.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing file based backups (FBBs), the method comprising:
   obtaining, by a backup agent, a backup request for a FBB;
   in response to the backup request, generating a FBB;
   identifying a compression ratio of a previous FBB metadata file;
   making a determination, based on the compression ratio, that the FBB metadata file does not require an assessment; and
   based on the determination, identifying a set of attribute regions, wherein the set of attribute regions are associated with the previous FBB metadata file;
   generating the FBB metadata file corresponding to the FBB, wherein the FBB metadata file comprises the set of attribute regions;
   performing, using the set of attribute regions, a deduplication on the FBB metadata file to obtain a deduplicated FBB metadata file; and
   storing the deduplicated FBB metadata file in a backup storage system.

2. The method of claim 1, wherein the determination is based on a compression ratio threshold.

3. The method of claim 1, wherein the set of attribute regions comprises a constant attribute region and a plurality of variable attribute regions.

4. The method of claim 3, wherein the constant attribute region comprises at least one of: a file identifier attribute, a parent file identifier and a container identifier.

5. The method of claim 3, wherein a variable attribute region of the plurality of variable attribute regions comprises at least one of: a file size, a hash value of a file, and an offset of the file.

6. A non-transitory computer readable medium comprising computer readable program code, which when executed by a computer processor enables the computer processor to perform a method for managing file based backups (FBBs), the method comprising:
- obtaining, by a backup agent, a backup request for a FBB;
- in response to the backup request, generating a FBB;
- identifying a compression ratio of a previous FBB metadata file;
- making a determination, based on the compression ratio, that a FBB metadata file does not require an assessment; and
- based on the determination, identifying a set of attribute regions, wherein the set of attribute regions are associated with the previous FBB metadata file;
- generating the FBB metadata file corresponding to the FBB, wherein the FBB metadata file comprises the set of attribute regions;
- performing, using the set of attribute regions, a deduplication on the FBB metadata file to obtain a deduplicated FBB metadata file; and
- storing the deduplicated FBB metadata file in a backup storage system.

7. The non-transitory computer readable medium of claim 6, wherein the determination is based on a compression ratio threshold.

8. The non-transitory computer readable medium of claim 6, wherein the set of attribute regions comprises a constant attribute region and a plurality of variable attribute regions.

9. The non-transitory computer readable medium of claim 8, wherein the constant attribute region comprises at least one of: a file identifier attribute, a parent file identifier and a container identifier.

10. The non-transitory computer readable medium of claim 8, wherein a variable attribute region of the plurality of variable attribute regions comprises at least one of: a file size, a hash value of a file, and an offset of the file.

11. A system comprising:
- a processor; and
- memory comprising instructions, which when executed by the processor, perform a method comprising:
  - obtaining, by a backup agent, a backup request for a FBB;
  - in response to the backup request, generating a FBB;
  - identifying a compression ratio of a previous FBB metadata file;
  - making a determination, based on the compression ratio, that a FBB metadata file does not require an assessment; and
  - based on the determination, identifying a set of attribute regions, wherein the set of attribute regions are associated with the previous FBB metadata file;
  - generating the FBB metadata file corresponding to the FBB, wherein the FBB metadata file comprises a set of attribute regions;
  - performing, using the set of attribute regions, a deduplication on the FBB metadata file to obtain a deduplicated FBB metadata file; and
  - storing the deduplicated FBB metadata file in a backup storage system.

* * * * *